US006575607B1

United States Patent
Klemish et al.

(10) Patent No.: US 6,575,607 B1
(45) Date of Patent: Jun. 10, 2003

(54) USER CONTROLLABLE COLOR LIGHTING IN A VEHICLE INSTRUMENT CLUSTER

(75) Inventors: Melissa Marie Klemish, Chesaning, MI (US); Andrew Michael Voto, Swartz Creek, MI (US); Ronald Kenneth Selby, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/541,708

(22) Filed: Apr. 3, 2000

(51) Int. Cl.[7] .................................................. B60Q 1/00
(52) U.S. Cl. ........................ 362/489; 362/510; 362/544; 362/543; 362/23; 362/30; 362/29
(58) Field of Search ........................... 362/29, 30, 23, 362/489, 510, 543, 544, 545

(56) References Cited

U.S. PATENT DOCUMENTS 5,361,059 A * 11/1994 Hoffman et al. ............ 340/438
5,975,728 A * 11/1999 Weyer ....................... 362/30 X
6,206,533 B1 * 3/2001 Shi ............................. 362/23

FOREIGN PATENT DOCUMENTS

EP            0562332       * 5/1993    ............... 340/438

* cited by examiner

Primary Examiner—Sandra O'Shea
Assistant Examiner—Bertrand Zeade
(74) Attorney, Agent, or Firm—Stefan V. Chmielewski; Jimmy L. Funke

(57) ABSTRACT

A user controllable lighting system for a vehicle instrument cluster, including: selection apparatus to select a color scheme for individual gage area components of the vehicle instrument cluster; illumination apparatus to illuminate the individual gage area components in accordance with selections made by the selection apparatus; and control apparatus operatively connected to the selection apparatus and to the illumination apparatus to receive the selections made by the selection apparatus and to furnish instructions to the illumination apparatus.

11 Claims, 3 Drawing Sheets

USER CONTROLLABLE COLOR LIGHTING IN A VEHICLE INSTRUMENT CLUSTER

BACKGROUND OF THE INVENTION

1. Field of the Invention

The present invention relates to vehicle instrument clusters generally and, more particularly, but not by way of limitation, to novel user controllable color lighting in a vehicle instrument cluster.

2. Background Art

Vehicle instrument clusters of the type under consideration here are found, for example, in automobiles, trucks, watercraft, aircraft, ATVs, and the like. Most, if not all, vehicle instrument clusters include some means of artificial lighting of the elements of the instrument cluster, generally in the form of electrical illumination to provide backlighting of the elements of the instrument cluster. Illumination, of course, is required to permit the operator of a vehicle and others, if necessary, to read in conditions of otherwise low visibility the gages, dials, etc. that are included in the instrument cluster.

Known vehicle instrument clusters provide illumination in only a narrow range of frequencies such that the illumination appears to be of a single, particular color. Usually, some means is provided to permit the operator of the vehicle to adjust the intensity of the illumination. While the preferred level of intensity will vary among operators of a vehicle, having the ability to make adjustments to the intensity to suit various operators is, of course, desirable such that the intensity not be too high or too low to the degree that the level of intensity of illumination interferes with the comfort of a vehicle operator or the safe operation of the vehicle.

No known illuminated vehicle instrument clusters permit the operator of a vehicle to adjust the color of the illumination of the vehicle instrument cluster or to vary the colors of the illumination for various portions of the vehicle instrument cluster. While such ability to adjust color could satisfy personal comfort and esthetic preferences, varying the colors of the illumination for various portions of the vehicle instrument cluster can also increase the level of safe operation of the vehicle by permitting the operator of the vehicle, for example, to set a bright color for the speed indicating portion of the vehicle instrument cluster and to set a less bright color for the tachometer and fuel level indicating portions of the vehicle instrument cluster. Thus, immediately important portions of the vehicle instrument cluster can be highlighted in terms of color and intensity, while less immediately important portions of the vehicle instrument cluster can be more subdued in terms of color and intensity of illumination thereof.

Accordingly, it is a principal object of the present invention to provide user controllable color lighting in a vehicle instrument cluster.

It is a further object of the invention to provide such user controllable color lighting that permits the operator of a vehicle to vary the intensity of the color lighting.

It is another object of the invention to provide such user controllable color lighting that permits the operator of a vehicle to vary the color of illumination of various portions of the vehicle instrument cluster.

It is an additional object of the invention to provide such user controllable color lighting that permits the operator of the vehicle to vary both the color and intensity of illumination of various portions of the vehicle instrument cluster.

It is yet a further object of the invention to provide such user controllable color lighting that can be economically implemented in a vehicle instrument cluster.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a user controllable lighting system for a vehicle instrument cluster, comprising: selection means to select a color scheme for individual gage area components of said vehicle instrument cluster; illumination means to illuminate said individual gage area components in accordance with selections made by said selection means; and control means operatively connected to said selection means and to said illumination means to receive said selections made by said selection means and to furnish instructions to said illumination means.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
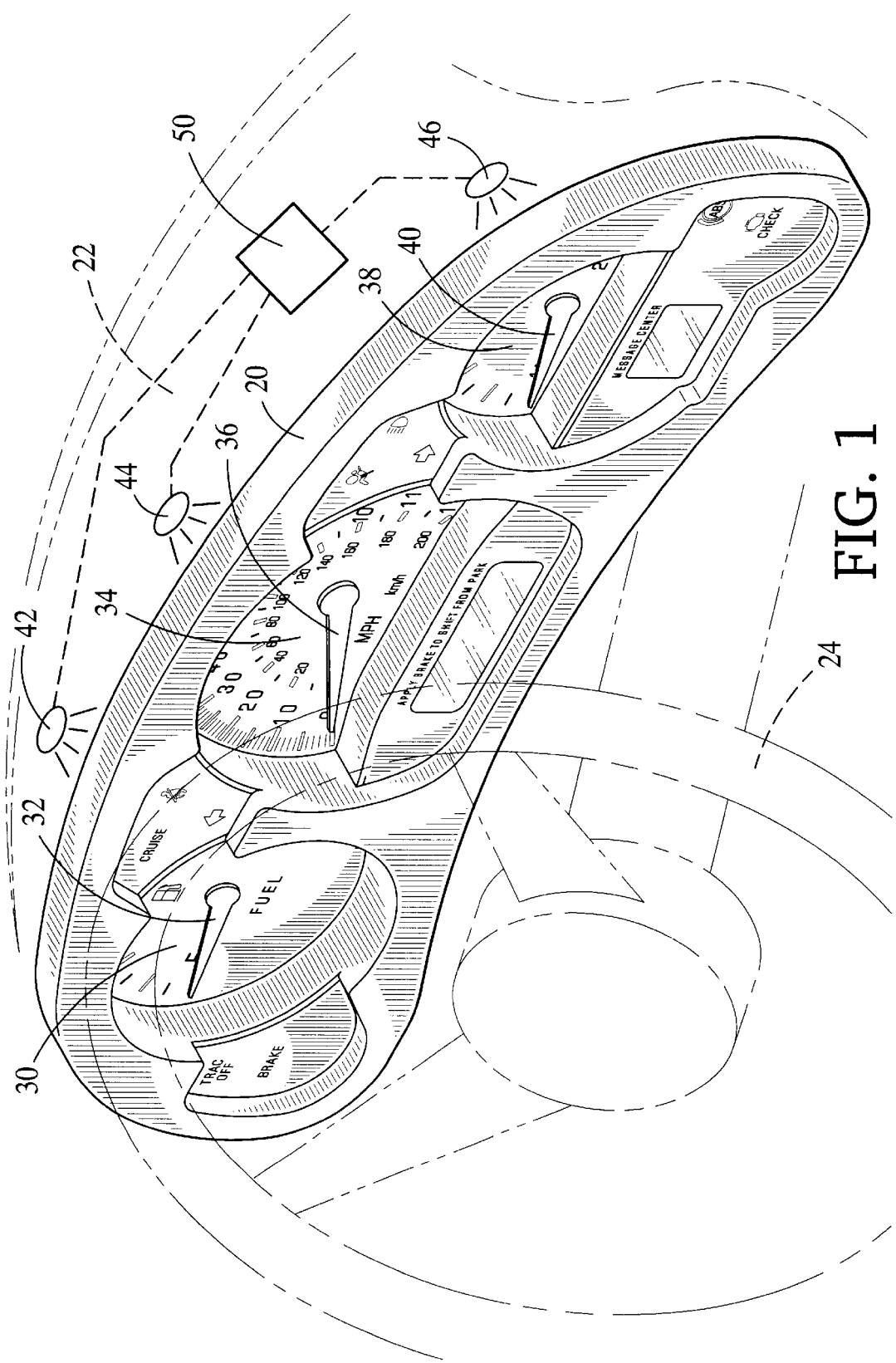
FIG. 1 is a partially schematic isometric view of an example of a vehicle instrument cluster with which the present invention may be employed.

Reference should now-be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

In general, the present invention provides the ability for operators of a vehicle to tune in the color scheme for the vehicle instrument cluster backlighting and pointer colors that each of the operators prefers and then store them for recall. At any time, a vehicle operator can decide to change the color for that operator. Each vehicle operator can have a color scheme and/or intensity level that is specific to that vehicle operator. More than one color scheme per vehicle operator can be provided. A vehicle operator could, for example, program one color scheme for daytime vehicle operation and another color scheme for nighttime vehicle operation. Because illumination for each gage area and pointer is controlled individually, a vehicle operator can also choose to turn off the backlighting illumination on any gage area or pointer.

Wherever herein "color scheme" is referred to, it will be understood that such encompasses any desired theme and includes any desired light intensity and/or color palette. Lighting elements, LEDs, for example, may be monochromatic, two-color, or multicolor. Lighting may be provided such that it is visible during either daytime or nighttime conditions. Whenever herein "gage area" is referred to, it will be understood that such encompasses groups of gages, or zones, as well a individual gages.

FIG. 1 illustrates an example of a vehicle instrument cluster 20 with which the present invention may be employed. Vehicle instrument cluster 20 is mounted in a vehicle dashboard 22 behind, or forward of, vehicle steering wheel 24. Vehicle instrument cluster 20 includes a fuel gage area 30 with a pointer 32, a speedometer gage area 34 with a pointer 36, and an engine temperature gage area 38 with a pointer 40. Fuel gage area 30 is illuminated by first backlighting illumination means 42, speedometer gage area 34 is illuminated by second backlighting illumination means 44, and engine temperature gage area 34 is illuminated by third backlighting illumination means 44. First, second, and third backlighting illumination means 42, 44, and 46 are operatively connected to and under the control of a programmable microprocessor 50. First, second, and third backlighting illumination means 42, 44, and 46 may represent multicolor LEDs, or edge lighting means, or any other type of backlighting illumination means and also may represent separate lighting means for both the gage areas and the pointers with which they are associated.

It will be understood that the arrangement of vehicle instrument cluster 20 is provided for illustrative purposes and that a vehicle instrument cluster to which the present invention may be applied may include a greater or fewer number of illuminated areas, each of which may have the color and intensity of illumination individually controlled. Also, as noted above, pointers and general background of the areas in which the pointers are disposed can have individual backlighting illumination means. There is an unlimited number of variations of pointer, gage area, colors, etc. that can be provided with the present invention and the ones described are for illustrative purposes and are not to be considered a limitation on the present invention.

Figure 2:
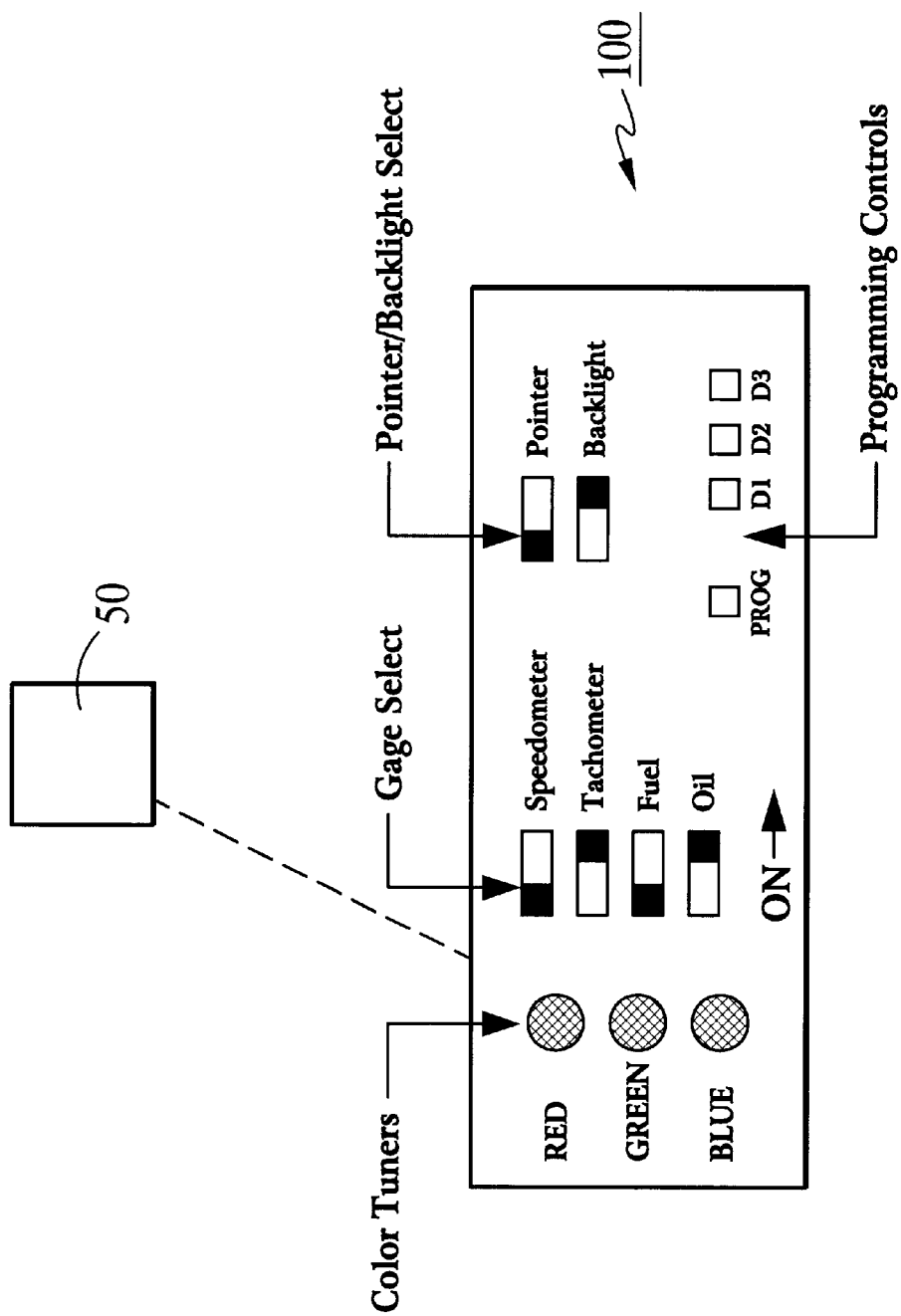
FIG. 2 is a front plan view of a driver interface for use in the present invention.

FIG. 2 illustrates a driver interface panel, generally indicated by the reference numeral 100. Driver interface panel 100 is preferably disposed in vehicle instrument cluster 20 (FIG. 1) and is operatively connected to programmable microprocessor 50 (FIG. 1) to change the programming thereof. Driver interface 100 may be analog, as shown on FIG. 2, or it may be digital (and include digital switch devices such as touch pads, for example).

The default factory setup for the color scheme can be, for example, the color white for all programmable backlighting illumination means. At any time, within limits set by the vehicle manufacturer, a vehicle operator, a vehicle dealer, or other authorized person can change the default color scheme to that which the vehicle operator, the vehicle dealer, or other authorized person prefers. To the extent permitted, which component of the instrument cluster that is to have its color changed can be selected. With reference to FIG. 2, for example, this can be done through the Gage Select switches and the Pointer/Backlight Select Switches. By toggling these switches, it is determined which gages and which part of the gage (pointer color or gage area color) is being changed. For instance, with reference to FIG. 2 and the toggle switches in the positions shown thereon, the Color Tuners would control the Backlighting of the Tachometer and the Oil Gage. All the other colors would stay the same. To change the Speedometer backlighting, all Gage Select Switches would be placed in the OFF position except the Speedometer and Backlight switches. When driver interface 100 is digital, the switches can be replaced with touch pads, for example, and the length of time a touch pad is pressed can be used to determined the intensity of illumination of the parameter being adjusted.

Once the vehicle operator, or other authorized person, is satisfied with the color and intensity selections, the vehicle operator, or other authorized person, presses the pushbutton "PROG" and then presses pushbutton "D1", "D2", or "D3". This stores the selections in memory in the memory section associated with the "D" pushbutton pressed. To recall the selection, the vehicle operator simply presses the same memory pushbutton. Alternatively, when the vehicle operator hits the key fob button on a keyless remote entry device, for example, the vehicle operator identification information is transmitted to the receiver in the vehicle. This receiver (already existing in vehicles and not part of the present invention) decodes the identification information and then informs the other modules in the vehicle the identification of the vehicle operator. Programmable microprocessor 50 (FIG. 1) receives the identification information from the receiver and, when the lights on instrument cluster 20 are in power up mode (key in ignition and turned), the programmable microprocessor can initialize the backlighting area and pointer color scheme to that which that vehicle operator had stored for recall.

Figure 3:
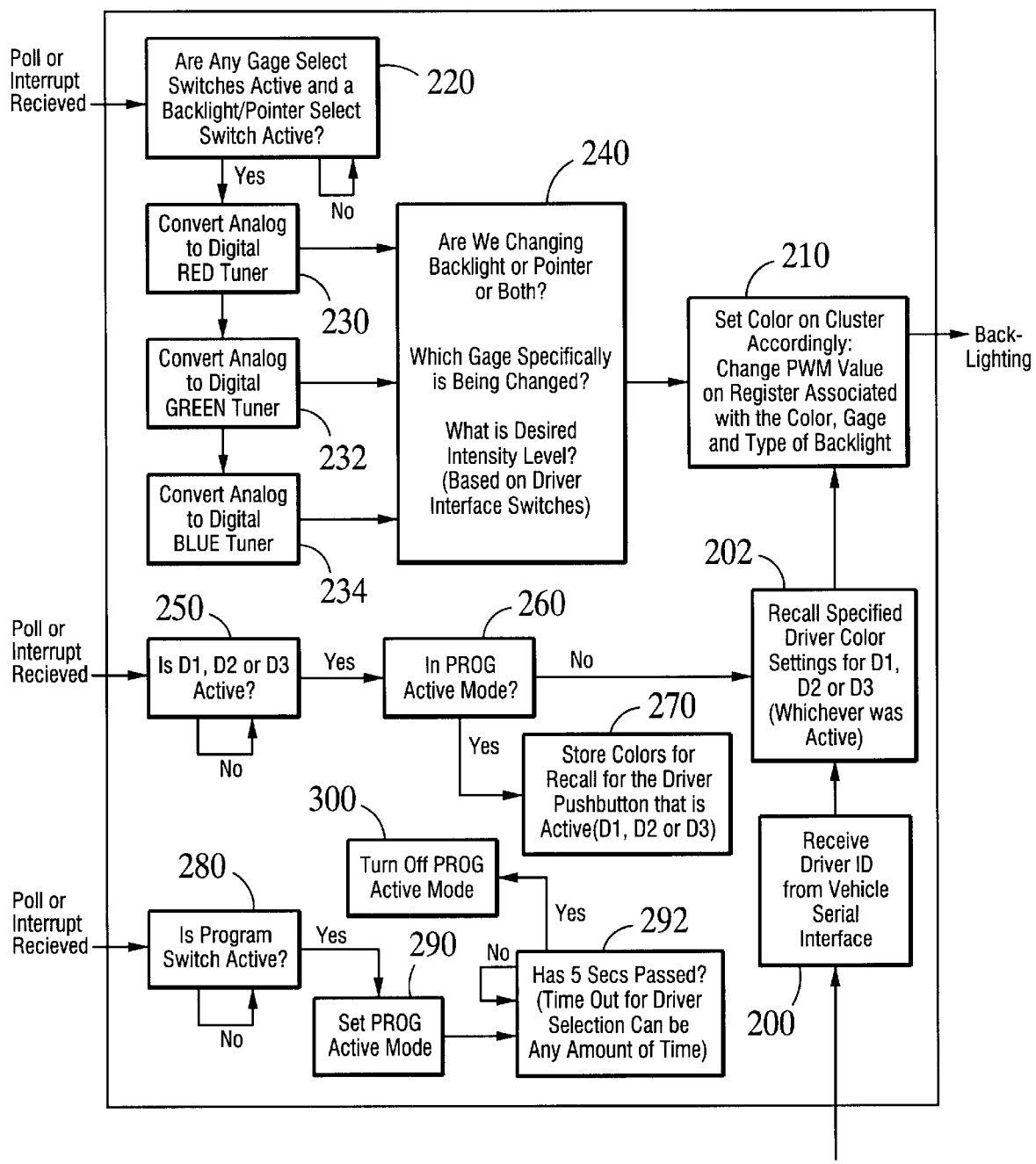
FIG. 3 is a software algorithm logic flow diagram for the present invention.

FIG. 3 illustrates an algorithm logic flow diagram for the present invention. Assuming a vehicle operator has made and stored a color scheme, when a vehicle operator identification is received at 200, this causes the last color scheme used or placed in memory to be recalled from memory at 202. The recalled color scheme is then used at 210 to set the backlighting illumination.

If a poll or interrupt signal is received at 220 and no Gage Select or Pointer/Backlight Select switches (FIG. 2) are active, no further action is taken at 220. If any of those switches is active, analog to digital red, green, and blue tuners are converted at 230, 232, and 234, respectively. Then the vehicle operator selects the desired color scheme and intensities thereof at 240 and the backlighting illumination is set accordingly at 210.

If a poll or interrupt signal is received at 250 and none of switches "D1", "D2", or "D3" (FIG. 2) is active, no further action takes place at 250. If one of those switches is active and "PROG" is not in active mode at 260, the color scheme corresponding to the active one of those switches is recalled from memory at 202 and the backlighting illumination color scheme is activated at 210. If "PROG" is active at 260, the backlighting illumination color scheme corresponding to the active one of switches "D1", "D2", or "D3" is stored in memory at 270.

If a poll or interrupt signal is received at 280 and the "PROG" switch (FIG. 2) is not active, no further action takes place at 280. If the "PROG" switch is active, the "PROG" active mode is set at 290 and a timer at 292 gives the vehicle operator an arbitrary predetermined amount of time in which to make color scheme selections, in this case, five seconds, although any length of time may be selected. If no color selection is made within the predetermined amount of time, the "PROG" active mode is turned off at 300.

It will be understood that the present invention contemplates that colors and intensities of any number of gage areas and pointers may be individually set and stored in any number of memory locations for later recall, the specific ones shown being for illustrative purposes.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A user controllable lighting system for a vehicle instrument cluster, comprising:
   (c) selection means to select a color scheme for individual gage area components of said vehicle instrument cluster;
   (d) illumination means to illuminate said individual gage area components in accordance with selections made by said selection means;
   (c) control means operatively connected to said selection means and to said illumination means to receive said selections made by said selection means and to furnish instructions to said illumination means; and
   (d) wherein: said individual gage area components are one or more selected from the group consisting of a pointer and gage backlighting.

2. A user controllable lighting system for a vehicle instrument cluster, as defined in claim 1, wherein: said selection means also selects intensities of illumination of said color scheme.

3. A user controllable lighting system for a vehicle instrument cluster, as defined in claim 1, further comprising: memory means in which said selections can be stored after changing thereof by said user.

4. A user controllable lighting system for a vehicle instrument cluster, as defined in claim 3, wherein: said selections can be manually retrieved from said memory means.

5. A user controllable lighting system for a vehicle instrument cluster, as defined in claim 4, wherein: said selections can be automatically retrieved from said memory means when an operator commences operation of said vehicle.

6. In combination with a vehicle, a user controllable lighting system for an instrument cluster disposed in said vehicle, comprising:
   (a) selection means to select a color scheme for individual gage area components of said instrument cluster;
   (b) illumination means to illuminate said individual gage area components in accordance with selections made by said selection means;
   (c) control means operatively connected to said selection means and to said illumination means to receive said selections made by said selection means and to furnish instructions to said illumination means; and
   (d) wherein: said individual gage area components are one or more selected from the group consisting of a pointer and gage backlighting.

7. A user controllable lighting system for an instrument cluster, as defined in claim 6, wherein: said selection means also selects intensities of illumination of said color scheme.

8. A user controllable lighting system for an instrument cluster, as defined in claim 6, further comprising: memory means in which said selections can be stored after changing thereof by said user.

9. A user controllable lighting system for an instrument cluster, as defined in claim 8, wherein: said selections can be manually retrieved from said memory means.

10. A user controllable lighting system for an instrument cluster, as defined in claim 8, wherein: said selections can be automatically retrieved from said memory means when an operator commences operation of said vehicle.

11. A user controllable lighting system for an instrument cluster, as defined in claim 6, wherein: said instrument cluster is disposed in a dashboard of said vehicle.

* * * * *